(12) United States Patent
Ishimasa et al.

(10) Patent No.: US 12,429,677 B2
(45) Date of Patent: Sep. 30, 2025

(54) OPTICAL APPARATUS AND IMAGE-CAPTURING APPARATUS

(71) Applicant: CANON KABUSHIKI KAISHA, Tokyo (JP)

(72) Inventors: Toru Ishimasa, Kanagawa (JP); Mitsuru Morohashi, Tokyo (JP); Toshihiro Ogawa, Tokyo (JP); Kohei Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 18/066,102

(22) Filed: Dec. 14, 2022

(65) Prior Publication Data

US 2023/0258913 A1 Aug. 17, 2023

(30) Foreign Application Priority Data

Feb. 15, 2022 (JP) .................................. 2022-021459

(51) Int. Cl.
*G02B 15/14* (2006.01)
*G02B 15/20* (2006.01)

(52) U.S. Cl.
CPC ............ *G02B 15/142* (2019.08); *G02B 15/20* (2013.01)

(58) Field of Classification Search
CPC ........ G02B 15/142; G02B 15/20; G02B 7/08; G02B 7/102; G02B 7/04; G02B 7/022; G02B 7/026; G02B 7/10; G02B 7/105; G02B 15/02; G02B 15/04; G02B 15/08
USPC ........ 359/691, 684, 699, 700, 701, 704, 676
See application file for complete search history.

(56) References Cited

U.S. PATENT DOCUMENTS

| | | | | |
|---|---|---|---|---|
| 2005/0185950 A1* | 8/2005 | Omiya | ................... | G02B 7/102 396/349 |
| 2011/0134542 A1* | 6/2011 | Lee | ........................ | G02B 15/04 359/689 |
| 2014/0313602 A1* | 10/2014 | Kudoh | ................... | G02B 7/102 359/817 |
| 2017/0205602 A1* | 7/2017 | Kudoh | ................... | G02B 7/023 |

FOREIGN PATENT DOCUMENTS

CN 2881716 Y * 3/2007
JP H11-311828 A 11/1999

\* cited by examiner

*Primary Examiner* — William R Alexander
*Assistant Examiner* — Mackenzi Waddell
(74) *Attorney, Agent, or Firm* — Canon U.S.A., Inc. IP Division

(57) ABSTRACT

An optical apparatus includes first and second lens groups, a guide barrel having a straight-guiding groove, a cam barrel, and an interlocking member having a first coupling portion. The cam barrel includes a first cam groove that moves the first lens group and a second cam groove that is different from the first cam groove and moves the interlocking member. When the second lens group changes a focal length range of an optical system from a second focal length range to a first focal length range, the first lens group is moved in a direction of an optical axis by the straight-guiding groove and the first cam groove, the interlocking member is moved in the direction of the optical axis by the straight-guiding groove and the second cam groove, and the first coupling portion withdraws the second lens group to outside of an optical path of the first lens group.

12 Claims, 13 Drawing Sheets

OPTICAL APPARATUS AND IMAGE-CAPTURING APPARATUS

BACKGROUND

Field

The present disclosure relates to an optical apparatus, and especially relates to an optical apparatus capable of changing a focal length range.

Description of the Related Art

In an optical apparatus, such as a digital camera, a video camera, and an interchangeable lens, it is known that inserting a conversion lens into an optical path can change a focal length range.

Japanese Patent Application Laid-Open No. Hei 11-311828 discusses a technique of moving a conversion lens that is built into a camera main body to an insertion position at which the conversion lens is inserted into the optical path and a withdrawal position at which the conversion lens is withdrawn to the outside of the optical path. The built-in conversion lens mentioned herein is withdrawn to a space between a prism that guides an object image to a viewfinder and a flash unit stored in an upper portion of a lens barrel.

However, since the built-in conversion lens discussed in Japanese Patent Application Laid-Open No. Hei 11-311828 is moved to the withdrawal position using a dedicated actuator, a space in which the actuator is arranged inside a lens is required, and it is difficult to prevent the lens from growing in size.

SUMMARY

According to an aspect of the present disclosure, an optical apparatus includes a first lens group, a second lens group configured to change a focal length range of an optical system from a first focal length range to a second focal length range, a guide barrel including a straight-guiding groove, a cam barrel rotatably held by the guide barrel, and an interlocking member including a first coupling portion, wherein the cam barrel includes a first cam groove configured to move the first lens group and a second cam groove that is different from the first cam groove and is configured to move the interlocking member, and wherein, when the focal length range of the optical system transitions from the second focal length range to the first focal length range, the first lens group is configured to be moved in a direction of an optical axis by the straight-guiding groove and the first cam groove, the interlocking member is configured to be moved in the direction of the optical axis by the straight-guiding groove and the second cam groove, and the first coupling portion is configured to withdraw the second lens group to outside of an optical path of the first lens group.

Further features of the present disclosure will become apparent from the following description of exemplary embodiments with reference to the attached drawings.

DESCRIPTION OF THE EMBODIMENTS

An exemplary embodiment of the present disclosure will be described below with reference to drawings. An identical reference sign represents an identical part or a corresponding part throughout the drawings. While the description is given of an interchangeable lens as one example of an optical apparatus in the present exemplary embodiment, the present disclosure can be modified and changed in various manners without departing from the gist of the present disclosure, such as a lens-integrated camera besides the interchangeable lens.

Figure 1:
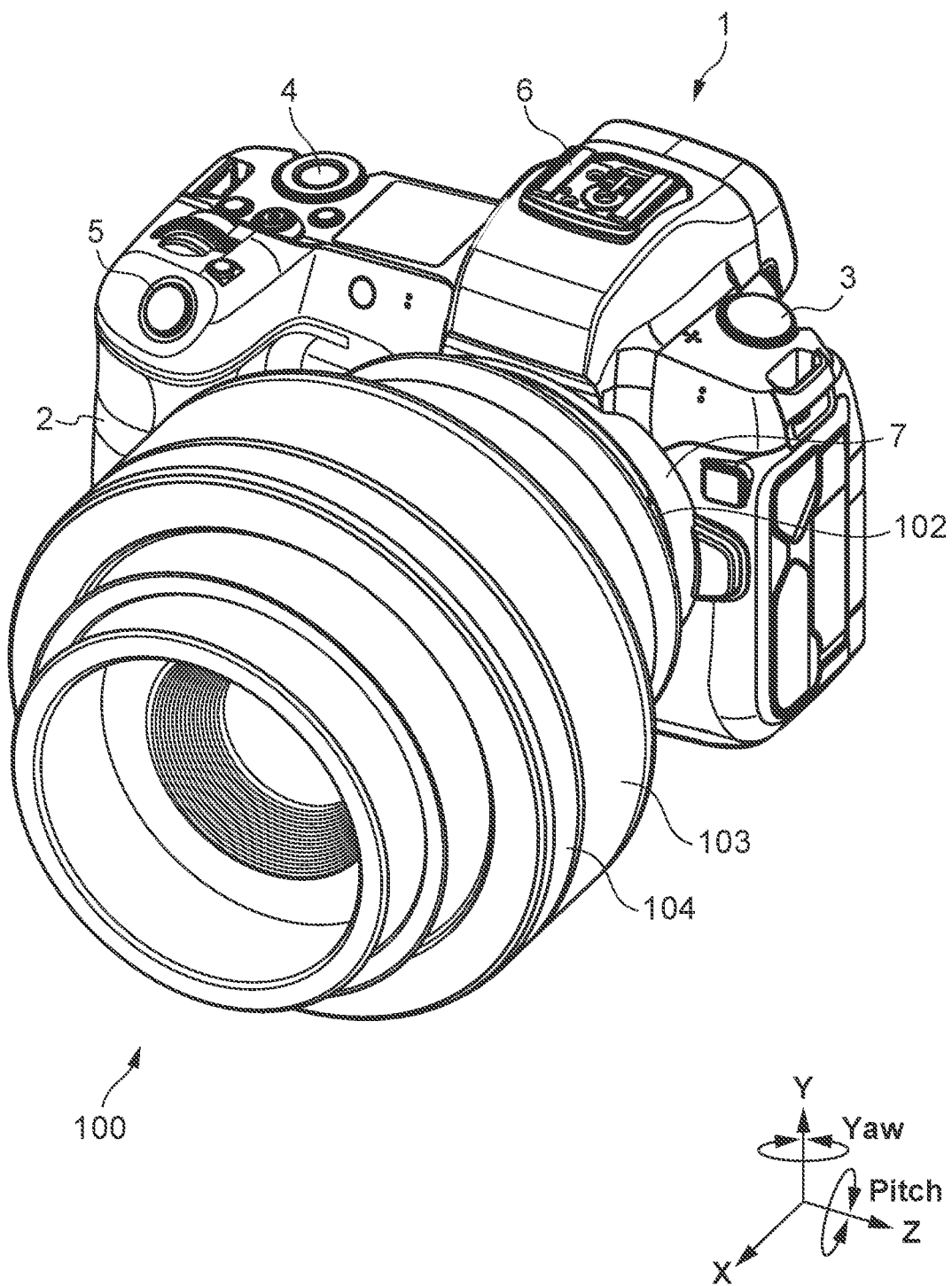
FIG. 1 is a front perspective view illustrating an interchangeable lens and a camera main body in a case of a second focal length range according to an exemplary embodiment of the present disclosure.
Figure 2:
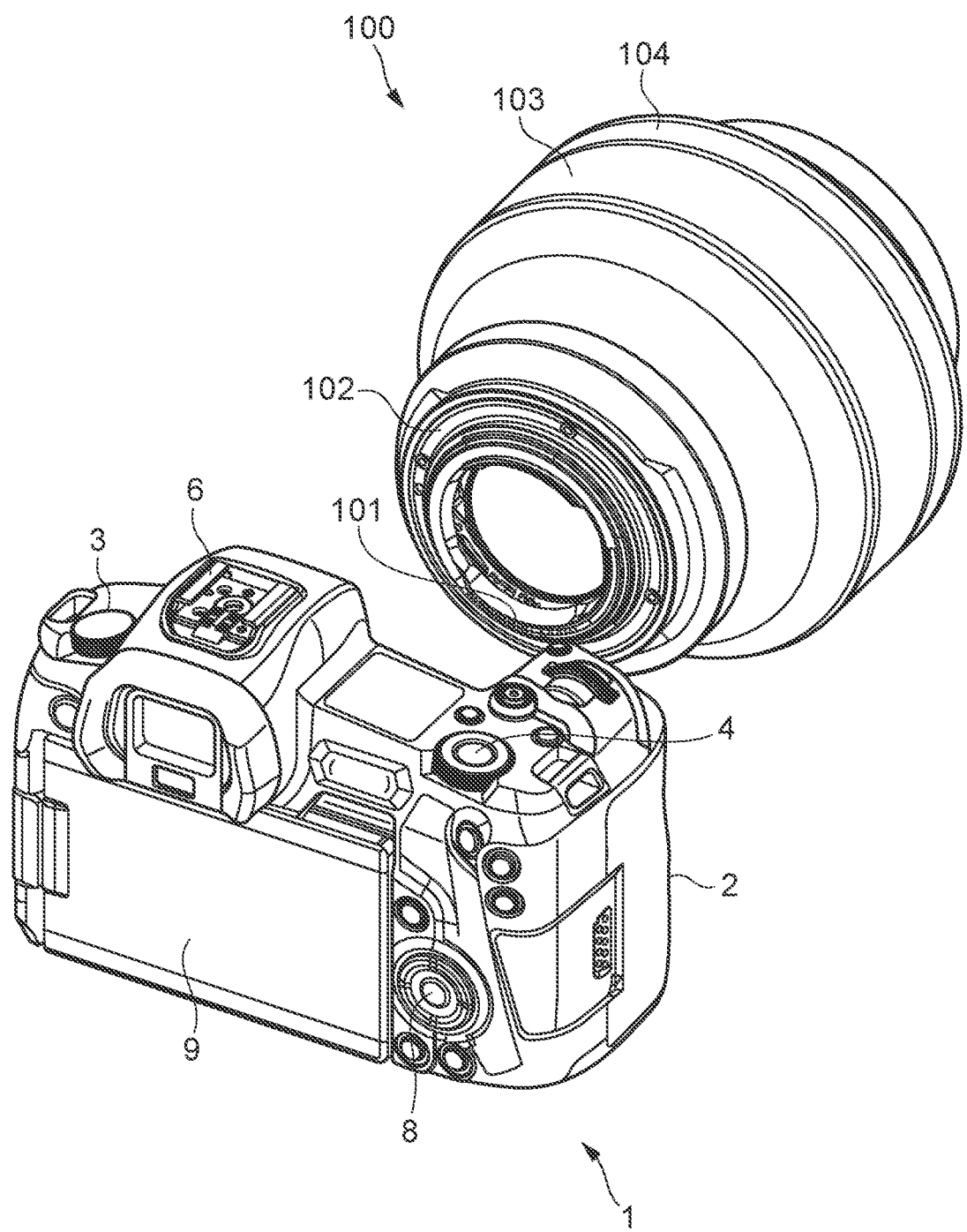
FIG. 2 is a rear perspective view illustrating the interchangeable lens and the camera main body in the case of the second focal length range according to the exemplary embodiment of the present disclosure.

FIGS. 1 and 2 each illustrate an outer appearance of an interchangeable lens 100 serving as the optical apparatus according to the exemplary embodiment of the present disclosure and a digital camera (hereinafter referred to as a camera main body) 1 on which the interchangeable lens 100 is detachably mounted. FIG. 1 is a front perspective view illustrating the interchangeable lens 100 (in a second focal length range) according to the exemplary embodiment and the camera main body 1. FIG. 2 is a rear perspective view illustrating the interchangeable lens 100 (in the second focal length range) according to the exemplary embodiment of the present disclosure and the camera main body 1 (when the interchangeable lens 100 is detached). In the present exemplary embodiment, as illustrated in FIG. 1, an optical axis direction, which is an extending direction of an optical axis of an imaging optical system included in the interchangeable lens 100 (a direction along the optical axis), is an X-axis direction, and directions orthogonal to the X-axis direction are a Z-axis direction (horizontal direction) and a Y-axis direction (vertical direction). Hereinafter, the Z-axis direction and the Y-axis direction are also collectively referred to as a Z/Y-axis direction. Additionally, a rotational direction around the Z-axis is referred to as a pitch direction, and a rotational direction around the Y-axis is referred to as a yaw direction. The pitch direction and the yaw direction (hereinafter also collectively referred to as a pitch/yaw direction) are rotational directions around respective two axes, which are the X-axis direction and the Y-axis direction orthogonal to each other.

A portion of the camera main body 1 illustrated in FIG. 1 on the left side when viewed from the front side (the right side when viewed from the rear side) is provided with a grip portion 2 for a user to grip the camera main body 1 with the user's hand. A power source operation unit 3 is arranged on an upper surface portion of the camera main body 1. When the user turns on the power source operation unit 3 with the camera main body 1 being in a power-off state, the camera main body 1 is started to be energized and is brought into a power-on state, and a computer program, such as processing of detecting an origin of a focus group (focus lens), is executed, and the camera main body 1 is brought into an image-capturing standby state. Conversely, when the user turns off the power source operation unit 3 with the camera main body 1 being in the power-on state, the camera main body 1 is brought into the power-off state.

The upper surface portion of the camera main body 1 is provided with a mode dial 4, a release button 5, and an accessory shoe 6. The user performs a rotational operation on the mode dial 4, and can thereby switch an image-capturing mode. The image-capturing mode includes a manual still-image-capturing mode in which the user can freely set an image-capturing condition such as shutter speed and an aperture value, an automatic still-image-capturing mode in which a correct exposure amount can be automatically obtained, and a moving-image-capturing mode for capturing moving images.

The user performs a half-press operation on the release button 5 to instruct an image-capturing preparation operation, such as autofocus and automatic exposure control. The user performs a full-press operation to instruct image-capturing. On the accessory shoe 6, an illumination device, such as an external flash unit, or an accessory (camera accessory), such as a luminescent device, is detachably mounted.

The interchangeable lens 100 is provided with a lens mount 102 that is mechanically connected to a camera mount 7 arranged in the camera main body 1. The interchangeable lens 100 also includes an electric connection member 101, and is electrically connected to the camera main body 1. As illustrated in FIG. 2, the electric connection member 101 according to the present exemplary embodiment is arranged in a phase on a lower side in a circumferential direction of the lens mount 102. However, the present disclosure is not limited thereto, and the electric connection member 101 may be arranged in a phase on an upper side.

An imaging optical system that causes light from an object to be formed as an object image on an image plane is accommodated in the interchangeable lens 100. A focus operation ring (operating member) 103 that is rotated around the optical axis by a user operation is arranged in an outer circumference of the interchangeable lens 100. For example, when the user performs a rotational operation on the focus operation ring 103 in a manual focus mode, the whole of lens groups that constitute the imaging optical system or part of the lens groups (focus group) is moved to a predetermined use position corresponding to an angle of the focus operation ring 103. In this manner, the user performs desired focusing (focus adjustment).

As illustrated in FIG. 2, a rear surface operation unit 8 and a display unit 9 are arranged on a rear surface of the camera main body 1. The rear surface operation unit 8 includes a plurality of buttons and dials to which various functions are allocated. When the camera main body 1 is in the power-on state and a still-image-capturing mode or a moving-image-capturing mode is set, a live view image of the object image captured by an image pickup element, which will be described below, is displayed on the display unit 9. On the display unit 9, image-capturing parameters are displayed indicating respective image-capturing conditions, such as shutter speed and an aperture value. The user operates the rear surface operation unit 8 while seeing the display, and can thereby change a setting value of a corresponding image-capturing parameter. The rear surface operation unit 8 includes a reproduction button for instructing reproduction of a recorded captured image. The user operates the reproduction button, whereby the captured image is reproduced and displayed on the display unit 9. The display unit 9 may be configured as a touch panel system and have functions similar to those of the rear surface operation unit 8.

Figure 3:
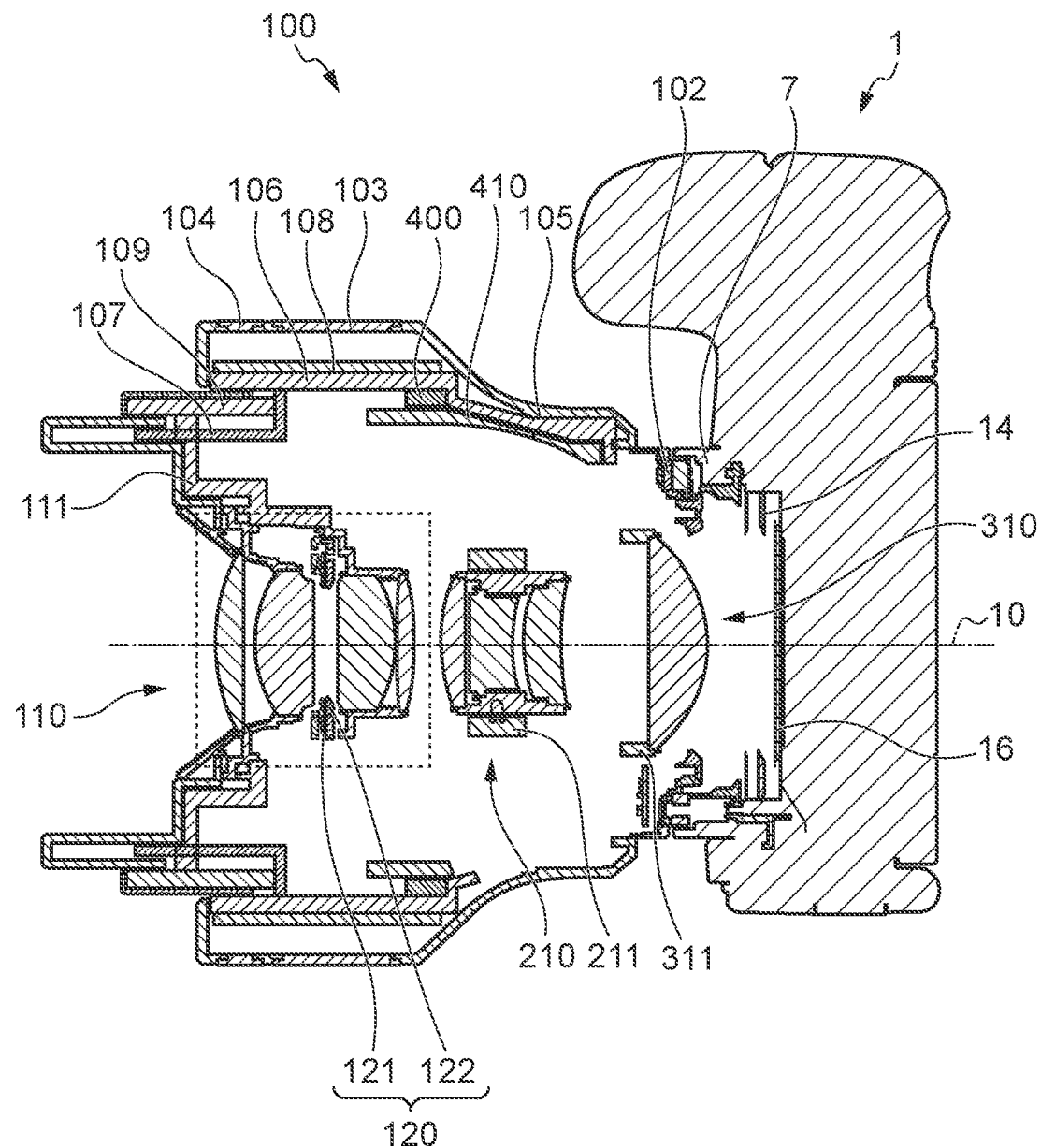
FIG. 3 is a cross-sectional view illustrating the interchangeable lens and the camera main body according to the exemplary embodiment of the present disclosure.
Figure 4:
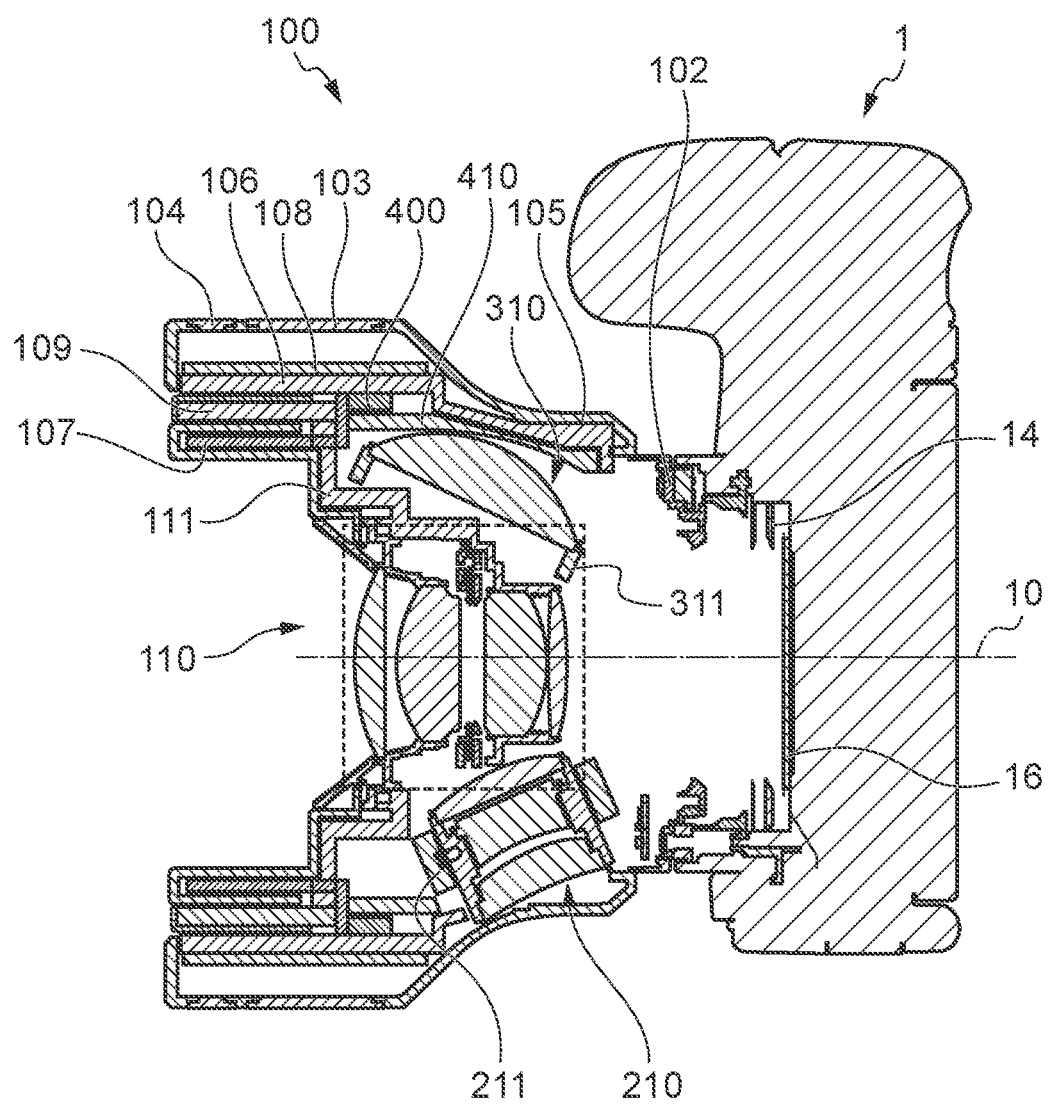
FIG. 4 is a cross-sectional view illustrating the interchangeable lens and the camera main body in a case of a first focal length range according to the exemplary embodiment of the present disclosure.

A positional relationship of members (components) constituting the interchangeable lens 100 according to the present exemplary embodiment will now be described with reference to FIGS. 3 and 4. FIGS. 3 and 4 are cross-sectional views on an X-Z plane including a first optical axis 10. FIG. 3 is a cross-sectional view illustrating the interchangeable lens 100 (in a second focal length range) according to the present exemplary embodiment and the X-Z plane of the camera main body 1 when viewed from a lower side in the Y-axis direction. FIG. 4 is a cross-sectional view illustrating the interchangeable lens 100 (in a first focal length range) according to the present exemplary embodiment and the X-Z plane of the camera main body 1 when viewed from the lower side in the Y-axis direction. A center line illustrated herein substantially coincides with the first optical axis 10 determined by a first lens group 110, and thus is assumed to be synonymous with the above-mentioned X axis in the following description.

An image plane 16 serving as the image pickup element is orthogonal to the first optical axis 10, and is synonymous with a Y-Z plane.

FIG. 3 illustrates a case where a focal length range of the imaging optical system is the second focal length range when a second lens group 210 and a third lens group 310 are arranged on the image plane side of the first lens group 110. FIG. 4 illustrates a case where the focal length range of the imaging optical system is the first focal length range when the second lens group 210 and the third lens group 310 have been withdrawn from the first optical axis 10 and the first lens group 110 has moved to a generated space. FIG. 3 illustrates a state where the entire length of the interchangeable lens 100 according to the present exemplary embodiment is large and FIG. 4 illustrates a state where the entire length of the interchangeable lens 100 according to the present exemplary embodiment is small. It is possible to perform image-capturing in either state.

The imaging optical system of the interchangeable lens 100 is composed of the first lens group 110, the second lens group 210, and the third lens group 310. The first lens group 110 serves as a master lens. The second lens group 210 and the third lens group 310 each serve as an extender lens, which is one type of a conversion lens. When the first lens group 110 is arranged on the first optical axis 10, and the second lens group 210 and third lens group 310 are not present on the first optical axis 10, the focal length range of the imaging optical system is the first focal length range. Meanwhile, when the second lens group 210 and the third lens group 310 are inserted onto the first optical axis 10 on the image plane side of the first lens group 110, the focal length range of the imaging optical system is changed from the first focal length range to the second focal length range. The first focal length range is in a wide-angle area corresponding to short focuses, and the second focal length range is in a telephoto area corresponding to long focuses. The interchangeable lens 100 includes a first holding frame 111, and a first cam barrel 108 and a second cam barrel 109. The first holding frame 111 holds the first lens group 110 serving as the master lens. The first and second cam barrels 108 and 109 moves the first holding frame 111 in the first optical axis 10 direction. The configuration allows the first lens group 110 to move in the first optical axis 10 direction in a corresponding focal length range, and enables desired focusing (focus adjustment).

In the following description, assume that an expression such as "from the first focal length range to the second focal length range" is an abbreviation for "the focal length range of the imaging optical system transitions from the first focal length range to the second focal length range".

Details will be described below, but the interchangeable lens 100 according to the present disclosure is capable of switching between the first focal length range and the second focal length range without using a dedicated actuator. FIGS. 1 to 3 each illustrate a case of the second focal length range in the telephoto area. When a rotational operation is performed by the user on the focus operation ring 103 in an infinite distance direction from the state in the second focal length range illustrated in each of FIGS. 1 to 3, the first lens group 110 is moved to the image plane side in conjunction with the rotational operation. At this time, the second lens group 210 held by a second holding frame 211 and the third lens group 310 held by a holding frame, which is not illustrated, are withdrawn from on the first optical axis 10 to respective withdrawal positions. The first lens group 110 is moved to a thus generated space and further retracted toward the image plane side, whereby the interchangeable lens 100 is brought into a state illustrated in FIG. 4, and the entire lens length of the interchangeable lens 100 is reduced as a whole.

While the master lens has a one-group configuration and the extender lens has a two-group configuration in the present exemplary embodiment, the present disclosure does not limit the configuration of the imaging optical system. For example, the master lens may have a multigroup configuration or a configuration including another independent focus group or an image stabilization lens group, and the extender lens may have a single group configuration. The conversion lens according to the present disclosure may be, unlike the extender lens described in the present exemplary embodiment, a wide conversion lens, a micro lens, or a reducer lens.

The first lens group 110 includes a diaphragm group 120 that performs a light amount adjustment operation, and is held by the first holding frame 111. The diaphragm group 120 is composed of a diaphragm drive unit (not illustrated), a plurality of diaphragm blades 121, and a drive ring 122. The diaphragm drive unit changes an aperture shape of the diaphragm blade 121 via the drive ring 122 to adjust a light amount.

A shutter unit 14 arranged in the camera main body 1 is a focal plane shutter including a leading blade and a trailing blade, each of which is composed of a plurality of light-shielding blades. At the time of image-capturing, the leading blade travels from a light-shielding position for closing an aperture to an exposure position for opening the aperture, and thereby passes light from the object therethrough toward the image plane 16. Thereafter, when set exposure time elapses, the trailing blade travels from the exposure position to the light-shielding position. At this time, a traveling direction of each of the leading blade and the trailing blade substantially coincides with a short side direction of the image pickup element in the camera main body 1, that is, the Y-axis direction.

A light ray incident from the object side on the interchangeable lens 100 passes through the aperture whose shape is formed by the diaphragm blade 121 while being subjected to an action of refraction caused by the first lens group 110. In the state illustrated in FIG. 3, light is further subjected to an action of light refraction caused by the second lens group 210 and the third lens group 310, thereafter passes through the aperture of the shutter unit 14, and is formed as an image on the image plane 16. In contrast, in the state illustrated in FIG. 4, light passes through the aperture of the shutter unit 14 without being subjected to the action of light refraction caused by the second lens group 210 and the third lens group 310, and is formed as an image on the image plane 16. That is, a traveling path of the light ray (optical path) is different depending on whether the focal length range of the imaging optical system is the first focal length range or the second focal length range.

A fixed barrel 106 is a fixed member that is fixed to the lens mount 102. In the fixed barrel 106, straight-guiding grooves (not illustrated) are formed at three-equally divided positions in the circumferential direction of the fixed barrel 106. Straight-guiding keys (not illustrated) arranged in a straight-guiding barrel 107 are fitted to the respective straight-guiding grooves, whereby the straight-guiding grooves restrict movement of the straight-guiding barrel 107 in the rotational direction and guide the straight-guiding barrel 107 in the first optical axis 10 direction. On an outer circumference side of the fixed barrel 106, the first cam barrel 108 is held by a bayonet (not illustrated) so as to be rotatable around the first optical axis 10, and is coupled to the focus operation ring 103 via a coupling key (not illustrated). In the straight-guiding barrel 107, similarly to the fixed barrel 106, straight-guiding grooves (not illustrated), to which respective straight-guiding keys (not illustrated) arranged in the first holding frame 111 are fitted, are formed at three-equally divided positions in the circumferential direction of the straight-guiding barrel 107. Fitting of the straight-guiding keys to the respective straight-guiding grooves restricts movement of the first holding frame 111 in the rotational direction, and guides the first holding frame 111 in the first optical axis 10 direction.

The second cam barrel 109 is held by a bayonet (not illustrated) on the outer circumference side of the straight-guiding barrel 107 so as to be rotatable around the first optical axis 10.

On an inner circumference side of the first cam barrel 108, first cam grooves (not illustrated), to which cam followers (not illustrated) arranged in the straight-guiding barrel 107 are fitted, are formed at three-equally divided positions in the circumferential direction of the first cam barrel 108. On an inner circumference side of the second cam barrel 109, second cam grooves (not illustrated), to which cam followers (not illustrated) arranged in the first holding frame 111 are fitted, are formed at three-equally divided positions in the circumferential direction of the second cam barrel 109. At this time, the second cam barrel 109 is configured to move integrally with the straight-guiding barrel 107 in the first optical axis 10 direction. In contrast, the first cam barrel 108 and the second cam barrel 109 are restricted from rotating by a coupling key (not illustrated), and rotates in conjunction with each other in the circumferential direction while relatively moving in the first optical axis 10 direction. Hence, when the user performs the rotational operation on the focus operation ring 103, the first holding frame 111 moves along the first optical axis 10 direction in a state of being restricted from moving in the rotational direction via the straight-guiding barrel 107 and the second cam barrel 109.

The present exemplary embodiment adopts such a configuration of the lens barrel of a so-called two-stage extension system, and thereby enables the movement of the first lens group 110 to the space generated by the withdrawal of the second lens group 210 and the third lens group 310. Especially in the case where the focal length range of the imaging optical system is the first focal length range in the wide angle area as illustrated in FIG. 4, retracting the first lens group 110 toward the image plane side enables reduction of the entire length of the interchangeable lens 100 and implementation of high portability.

Since the configuration of the lens barrel according to the present exemplary embodiment is a known technique that has been adopted to many optical apparatuses so far, a more detailed description thereof is omitted.

Conventionally, there exists a configuration of withdrawing a withdrawal lens group from the optical axis of the imaging optical system, narrowing an interval between lens groups, and moving the lens groups to respective stored positions that are close to each other, and thereby reducing the entire lens length in the optical axis direction. However, the configuration adopts a retraction mechanism for performing transition from an image-capturing state to a non-image-capturing state, and is not capable of performing image-capturing in a retracted state where the entire lens length is reduced. Hence, the configuration provides high portability but requires extra time for performing transition from the retracted state where the image-capturing is restricted to the state where the image-capturing can be performed.

In comparison with the conventional technique, in the present exemplary embodiment, the withdrawal of the second lens group 210 and the third lens group 310 causes the focal length range of the imaging optical system to be the first focal length range, and the image-capturing can be performed even in the state illustrated in FIG. 4 where the entire lens length is reduced. That is, in comparison with the optical apparatus that adopts the typical retraction mechanism, the present exemplary embodiment can reduce time required before the start of image-capturing, and can reduce loss of opportunities for image-capturing while implementing high portability.

A withdrawal base 410 is a cylindrical fixed member that is fixed to the inner circumference side of the fixed barrel 106. In a space between the fixed barrel 106 and the withdrawal base 410, an interlocking member 400 that is movable in the first optical axis 10 direction is arranged. The interlocking member 400 is a cylindrical moving member that rotationally withdraws the second lens group 210 and the third lens group 310, which will be described in detail below. On the inner circumference side of the first cam barrel 108, third cam grooves (not illustrated), to which respective cam followers 420 arranged in the interlocking member 400 are fitted in a corresponding manner, are formed in the circumferential direction of the first cam barrel 108. In the fixed barrel 106, straight-guiding grooves (not illustrated), to which the respective cam followers 420 arranged in the interlocking member 400 are fitted in a corresponding manner, are formed in the circumferential direction of the fixed barrel 106. Fitting of the cam followers 420 to the respective straight-guiding grooves restricts movement of the interlocking member 400 in the rotational direction, and guides the interlocking member 400 in the first optical axis 10 direction.

When the user performs a rotational operation on the focus operation ring 103, the interlocking member 400 moves, via the first cam barrel 108, along the first optical axis 10 direction between a position illustrated in FIG. 3 and a position illustrated in FIG. 4 in a state of being restricted from moving in the rotational direction. At this time, a moving direction of the interlocking member 400 is in an opposite relationship with a moving direction of the first lens group 110. For example, as illustrated in FIG. 3, in the state where the first lens group 110 has moved toward the object side, the interlocking member 400 is in a state of having moved toward the image plane side on the opposite side of the object side. As illustrated in FIG. 4, in the state where the first lens group 110 has moved toward the image side, the interlocking member 400 is in a state of having moved toward the object side on the opposite side of the image plane side.

Figure 5:
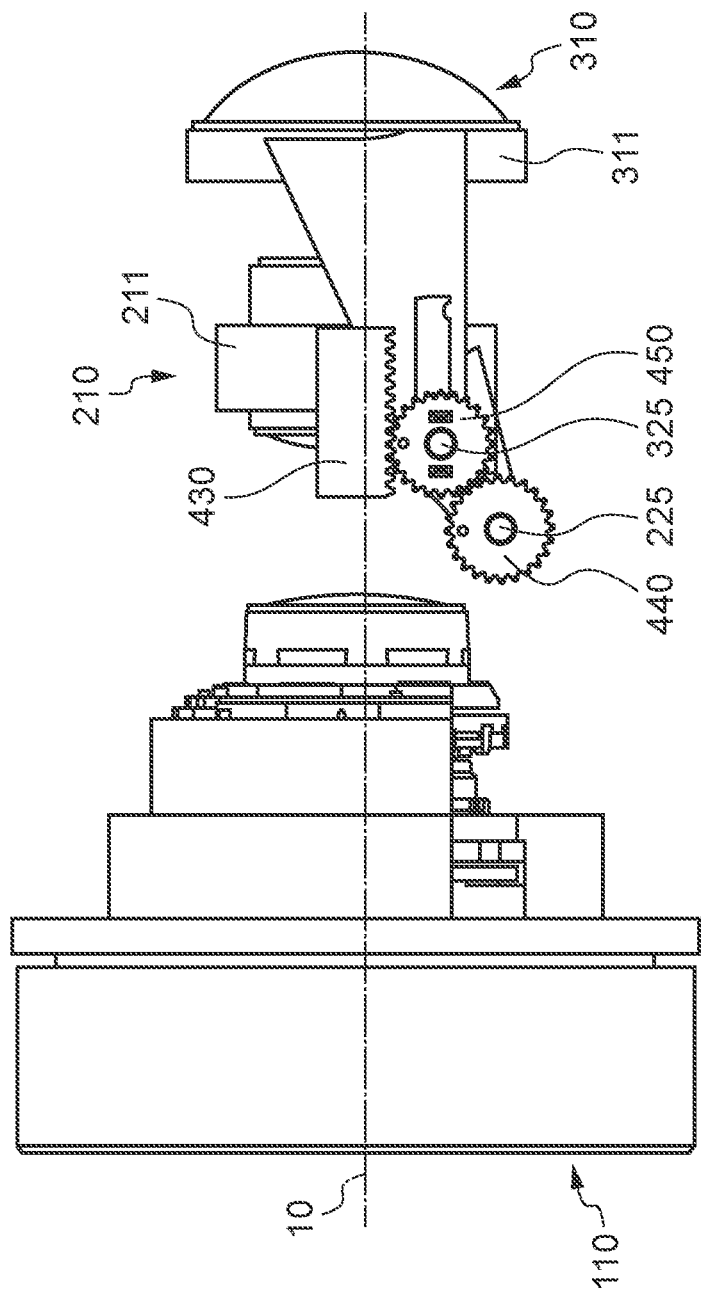
FIG. 5 is an external view illustrating each lens group of the interchangeable lens in the case of the second focal length range according to the exemplary embodiment of the present disclosure.
Figure 6:
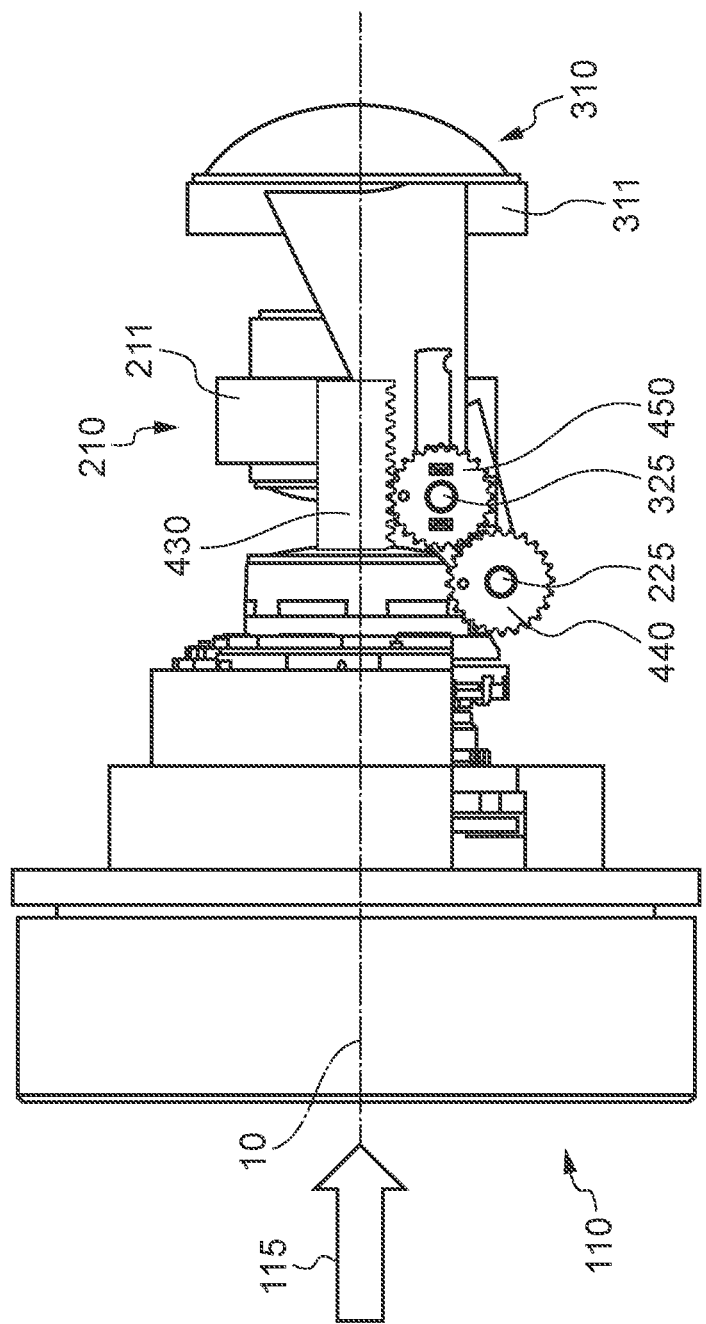
FIG. 6 is an external view illustrating each lens group of the interchangeable lens at a start of transition according to the exemplary embodiment of the present disclosure.
Figure 7:
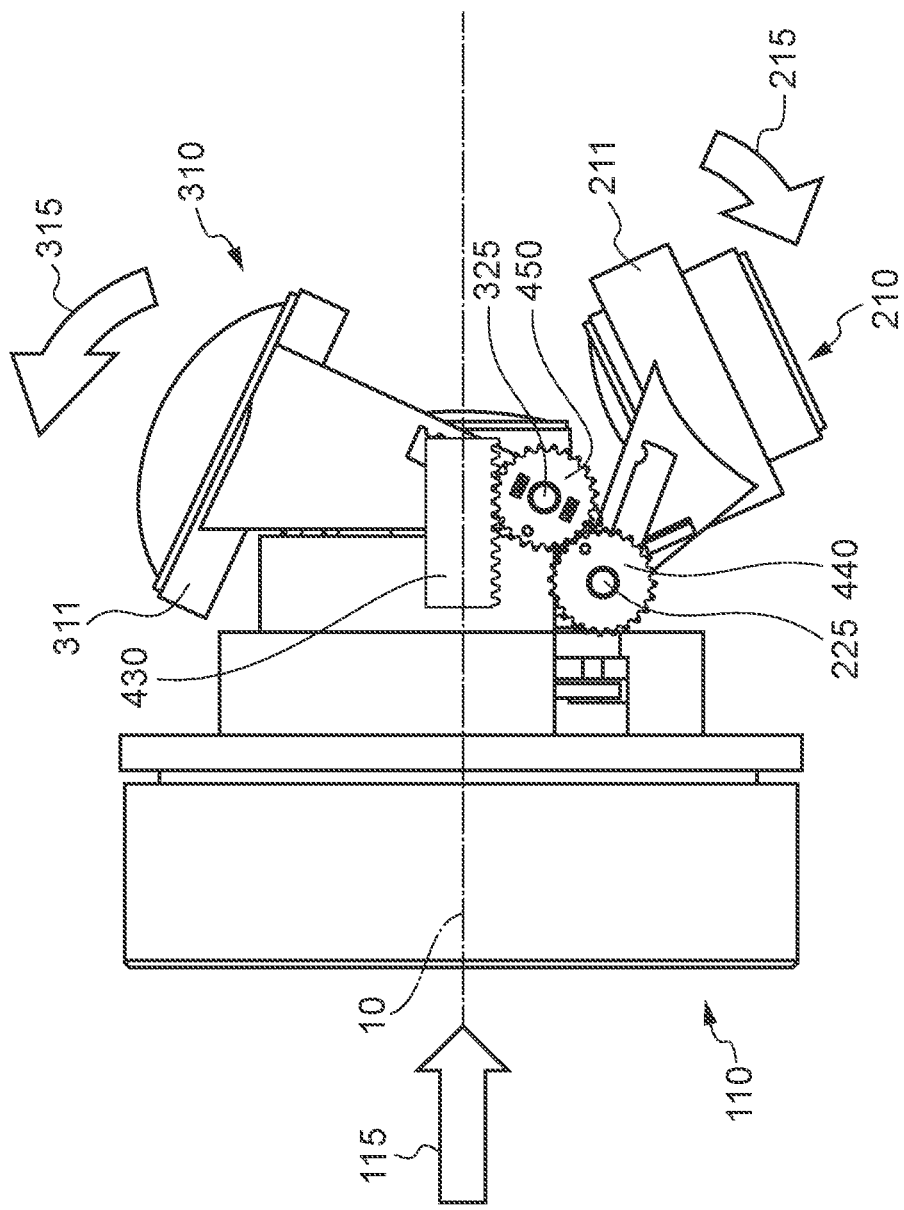
FIG. 7 is an external view illustrating each lens group of the interchangeable lens at completion of transition according to the exemplary embodiment of the present disclosure.
Figure 8:
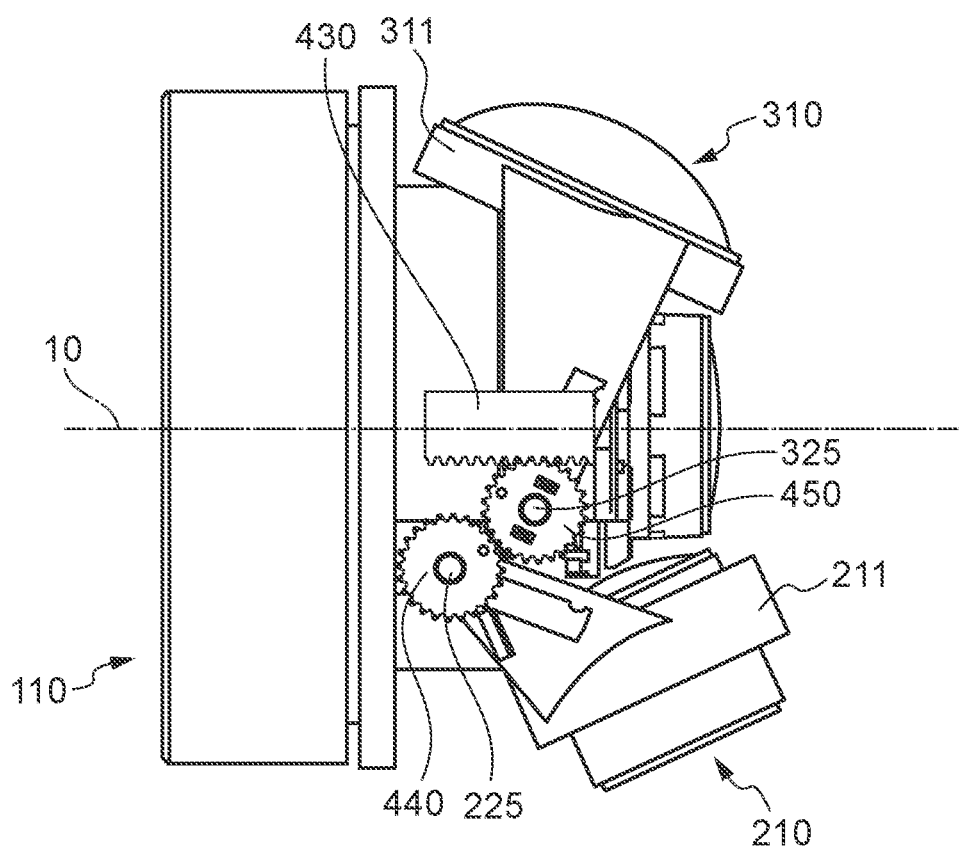
FIG. 8 is an external view illustrating each lens group of the interchangeable lens in the case of the first focal length range according to the exemplary embodiment of the present disclosure.

Movement of each lens group in the interchangeable lens 100 according to the present exemplary embodiment will now be described in detail with reference to FIGS. 5 to 8. FIGS. 5 to 8 are diagrams for describing outer appearances of the first lens group 110, the second lens group 210, and the third lens group 310. FIGS. 5 to 8 each illustrate the above-mentioned X-Z plane viewed from a lower side in the Y-axis direction, and each indicate transition from the second focal length range to the first focal length range. FIG. 5 is an external view illustrating each lens group of the interchangeable lens 100 (in the second focal length range) according to the present exemplary embodiment. FIG. 6 is an external view illustrating each lens group of the interchangeable lens 100 (at a start of transition) according to the present exemplary embodiment. FIG. 7 is an external view illustrating each lens group of the interchangeable lens 100 (at completion of transition) according to the present exemplary embodiment. FIG. 8 is an external view illustrating each lens group in the interchangeable lens 100 (in the first focal length range) according to the present exemplary embodiment.

FIG. 5 illustrates the case where the focal length range of the imaging optical system is the second focal length range. It can be seen from FIG. 5 that the first lens group 110, the second lens group 210, and the third lens group 310 are sequentially arranged from the object side at respective freely-selected positions on the first optical axis 10. In the case where the focal length range of the imaging optical system is the second focal length range, moving the first lens group 110 along the first optical axis 10 enables execution of desired focusing (focus adjustment). At this time, the second lens group 210 and the third lens group 310 are left within the above-mentioned optical path, and their respective positions do not shift.

The second lens group 210 is provided with a first rotary shaft 225, and the third lens group 310 is provided with a second rotary shaft 325. One end of the first rotary shaft 225 and one end of the second rotary shaft 325 are fixed to the withdrawal base 410, and the first rotary shaft 225 and the second rotary shaft 325 rotatably hold the second lens group 210 and the third lens group 310 with respect to the withdrawal base 410, respectively. An extending direction of the center of the first rotary shaft 225 and an extending direction of the center of the second rotary shaft 325 are substantially parallel with each other, and substantially orthogonal to the first optical axis 10. The first rotary shaft 225 and the second rotary shaft 325 preferably have a both-end support structure in which the first rotary shaft 225 and the second rotary shaft 325 are symmetrically arranged at two-equally divided positions when viewed from the first optical axis 10 direction. In the present exemplary embodiment, while the both-end support structure, which is more advantageous in terms of rigidity and durability than a one-end support structure, is adopted, the first rotary shaft 225 and the second rotary shaft 325 are arranged at respective positions overlapping with the first lens group 110 in the first optical axis 10 direction, as illustrated in FIG. 8.

In the interlocking member 400, a first coupling portion 430 (rack) is arranged at a position on the inner circumference side of the withdrawal base 410. The first coupling portion 430 has a configuration of moving integrally with the interlocking member 400 along the first optical axis 10. It is preferable that a pair of two first coupling portions 430 are symmetrically arranged when viewed from the first optical axis 10 direction.

The second lens group 210 is provided with a second coupling portion 440 (gear) centering around the first rotary shaft 225, and the third lens group 310 is provided with a third coupling portion 450 (gear) centering around the second rotary shaft 325. Similarly to the first coupling portion 430, it is preferable that a pair of two second coupling portions 440 are symmetrically arranged and a pair of two third coupling portions 450 are symmetrically arranged when viewed from the first optical axis 10 direction. The first coupling portion 430 and the third coupling portion 450 are coupled to each other by engagement between a rack and a gear, and the third coupling portion 450 and the second coupling portion 440 are coupled to each other by engagement between gears.

When the imaging optical system transitions from the second focal length range to the first focal length range, the first lens group 110 first starts to move in a first direction 115 that is substantially parallel with the first optical axis 10. Immediately after the start of transition, the first coupling portion 430 arranged in the interlocking member 400 is yet to move, and the second lens group 210 and the third lens group 310 remain to be inserted into the optical path, and their respective positions do not shift.

When the first lens group 110 further moves toward the image plane side along the first direction 115 beyond a range of desired focusing (focus adjustment), the first coupling portion 430 arranged in the interlocking member 400 starts moving toward the object side on the opposite side of the image plane side. The third coupling portion 450 rotates in a counter-clockwise direction around the second rotary shaft 325 with the movement of the first coupling portion 430, which is coupled to the third coupling portion 450 by the above-mentioned engagement, toward the object side. Similarly, the second coupling portion 440 rotates in a clockwise direction around the first rotary shaft 225 with the rotation of the third coupling portion 450, which is coupled to the second coupling portion 440 by the above-mentioned engagement. In this manner, when the first coupling portion 430 moves toward the object side, subsequently, the second lens group 210 is rotated and withdrawn in a second direction 215, and the third lens group 310 is rotated and withdrawn in a third direction 315 (FIG. 7).

As illustrated in FIG. 7, when the second lens group 210 and the third lens group 310 are further withdrawn in the second direction 215 and the third direction 315, respectively, to respective withdrawal positions outside the optical path, the first lens group 110 moves to a space generated with the withdrawal. A maximum rotatable angle of each of the second lens group 210 and the third lens group 310 is smaller than or equal to 90 degrees. The second lens group 210 and the third lens group 310 are withdrawn to respective spaces generated by the movement of the interlocking member 400. In the case where the focal length range of the imaging optical system is the second focal length range, the third lens group 310 is arranged on the image plane side of the second lens group 210. In the case of the first focal length range, the third lens group 310 is arranged on the object side of the second lens group 210.

In the present exemplary embodiment, the third lens group 310 is heavier than the second lens group 210, and the third lens group 310 has a larger withdrawal distance than that of the second lens group 210. In such a configuration, the second rotary shaft 325 is arranged in an opposite phase with respect to the third direction 315 when viewed from the first optical axis 10 direction, and can thereby be withdrawn in the third direction 315 in which a withdrawal distance is larger than that in the second direction 215. Focusing on the respective withdrawal directions of the second lens group 210 and the third lens group 310, it can be seen that the second direction 215 and the third direction 315 are symmetric directions across the first optical axis 10. Arranging the second lens group 210 and the third lens group 310 in the symmetric directions can cancel out and reduce vibrations and variations in center-of-gravity position, which are caused by the movement of the second lens group 210 in the second direction 215 and the movement of the third lens group 310 in the third direction 315.

FIGS. 5 to 8 are external views of the X-Z plane when viewed from the lower side in the Y-axis direction, as described above. Since the electric connection member 101 is arranged on the lower side on the Y-axis as illustrated in FIG. 2, it can be seen that the second lens group 210 and the third lens group 310 are withdrawn to respective phases that are different from that of the electric connection member 101. This enables effective utilization of a space in the surroundings of the lens mount 102, and can thereby prevent the interchangeable lens 100 from growing in size.

In a state illustrated in FIG. 5, the extending direction of the center of the first rotary shaft 225 and the extending direction of the center of the second rotary shaft 325 are substantially parallel with the Y-axis. The extending direction of the center of the first rotary shaft 225 and the extending direction of the center of the second rotary shaft 325 substantially coincide with the short side direction of the image pickup element in the camera main body 1, that is, a traveling direction of the light shielding blade of the shutter unit 14. At the time of image-capturing, the leading blade, which has traveled from the light-shielding position to the exposure position, collides with a stopper (not illustrated), and thereby stops. Since vibrations attributable to the collision of the leading blade are generated in the middle of exposure, there is a possibility that transmission of the vibrations due to the collision degrades image quality of a captured image. Thus, in the present exemplary embodiment, the withdrawal direction of each of the second lens group 210 and the third lens group 310 is substantially orthogonal to the traveling direction of the leading blade.

Furthermore, the Y-axis direction, which is the extending direction of the center of each of the first rotary shaft 225 and the second rotary shaft 325, is typically parallel with a direction in which the user places the camera main body 1 to which the interchangeable lens 100 is mounted. That is, when the user places the camera main body 1, the interchangeable lens 100 is subjected to an impact in the Y-axis direction that is different from the withdrawal direction of each of the second lens group 210 and the third lens group 310. In this manner, the present exemplary embodiment has a configuration that provides sufficiently high rigidity and that is less susceptible to influence of image quality degradation due to an impact caused by handling by the user.

Even after completion of withdrawal of the second lens group 210 and the third lens group 310, the first lens group 110 is capable of moving in the first direction 115. The first lens group 110 further moves in the first direction 115 from the state illustrated in FIG. 7 and completes a movement to a freely-selected position, whereby the transition from the second focal length range to the first focal length range is completed (FIG. 8). In the state illustrated in FIG. 8, the first lens group 110 is located the closest to the image plane than in any of the states illustrated in FIGS. 5 to 7. That is, the transition from the second focal length range to the first focal length range enables reduction in entire length of the interchangeable lens 100.

As described above, also in a state where the entire lens length is the smallest when the second lens group 210 and the third lens group 310 have been withdrawn and the first lens group 110 has moved toward the image plane side as illustrated in FIG. 8, it is possible to perform the image-capturing. Also in the case where the imaging optical system is in the first focal length range, similarly to the case of the second focal length range, desired focusing (focus adjustment) is performed by the movement of the first lens group 110 along the first optical axis 10. When the position of the first lens group 110 shifts, the respective positions of the second lens group 210 and the third lens group 310 do not shift.

The description has been given of the case of the transition from the second focal length range to the first focal length range. On the contrary, in the case of the transition from the first focal length range to the second focal length range, a reverse procedure of that illustrated in FIGS. 5 to 8 is taken. For example, when the first lens group 110 is moved from the image plane side to the object side by the user's operation, the second lens group 210 and the third lens group 310 are rotated and moved from the withdrawal position outside the optical path illustrated in FIG. 8 to respective positions within the optical path arranged on the first optical axis 10 illustrated in FIG. 5.

In the case of transition from the second focal length range to the first focal length range again, the second lens group 210 and the third lens group 310 are moved to the respective withdrawal positions outside the optical path also by the user's operation. In this manner, the interchangeable lens 100 according to the present exemplary embodiment is capable of switching between the first focal length range and the second focal length range without use of the dedicated actuator.

Figure 9:
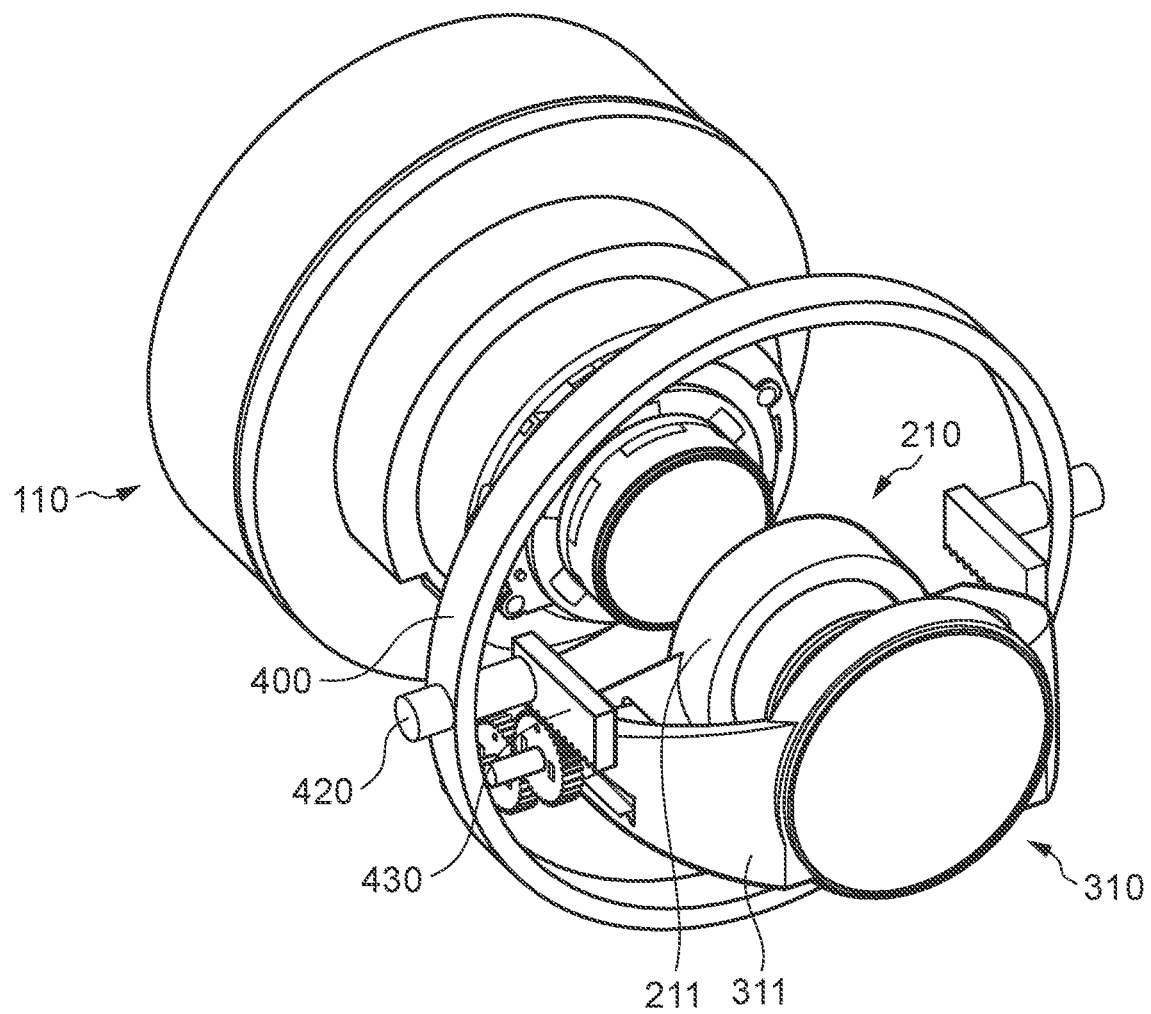
FIG. 9 is a perspective view illustrating each lens group of the interchangeable lens in the case of the second focal length range according to the exemplary embodiment of the present disclosure.

FIG. 9 is a perspective view illustrating the case where the imaging optical system is in the second focal length range similarly to FIG. 5. The first lens group 110, the second lens group 210, and the third lens group 310 are arranged in this order from the object side at respective freely-selected positions on the first optical axis 10. The interlocking member 400 is provided with the cam follower 420 and the first coupling portion 430. The cam follower 420 is arranged in a phase adjacent to the first coupling portion 430 in the circumferential direction.

Figure 10:
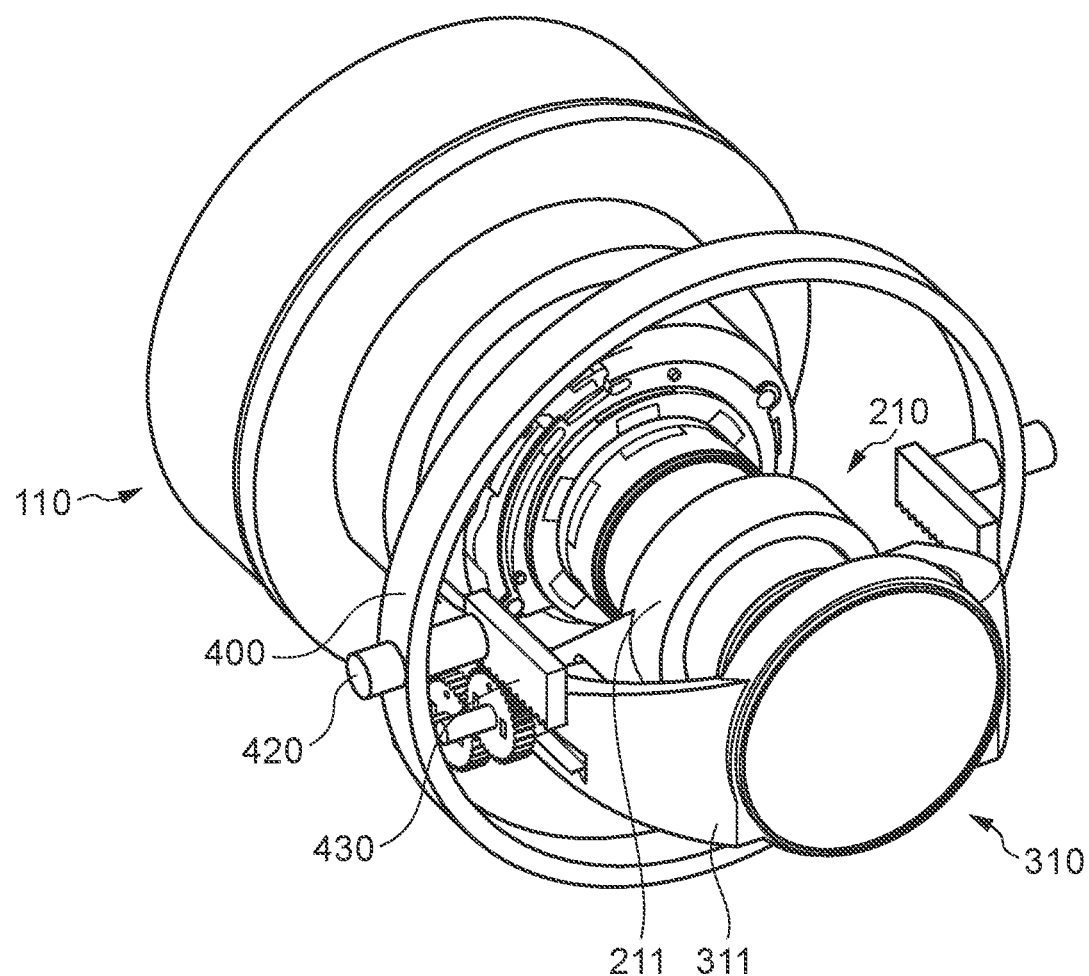
FIG. 10 is a perspective view illustrating each lens group of the interchangeable lens at the start of transition according to the exemplary embodiment of the present disclosure.

FIG. 10 is a perspective view illustrating each lens group at the start of transition from the second focal length range to the first focal length range similarly to FIG. 6. At the start of transition, the first lens group 110 has moved along the first optical axis 10 toward the image plane side, but the respective positions of the second lens group 210 and the third lens group 310 do not shift.

Figure 11:
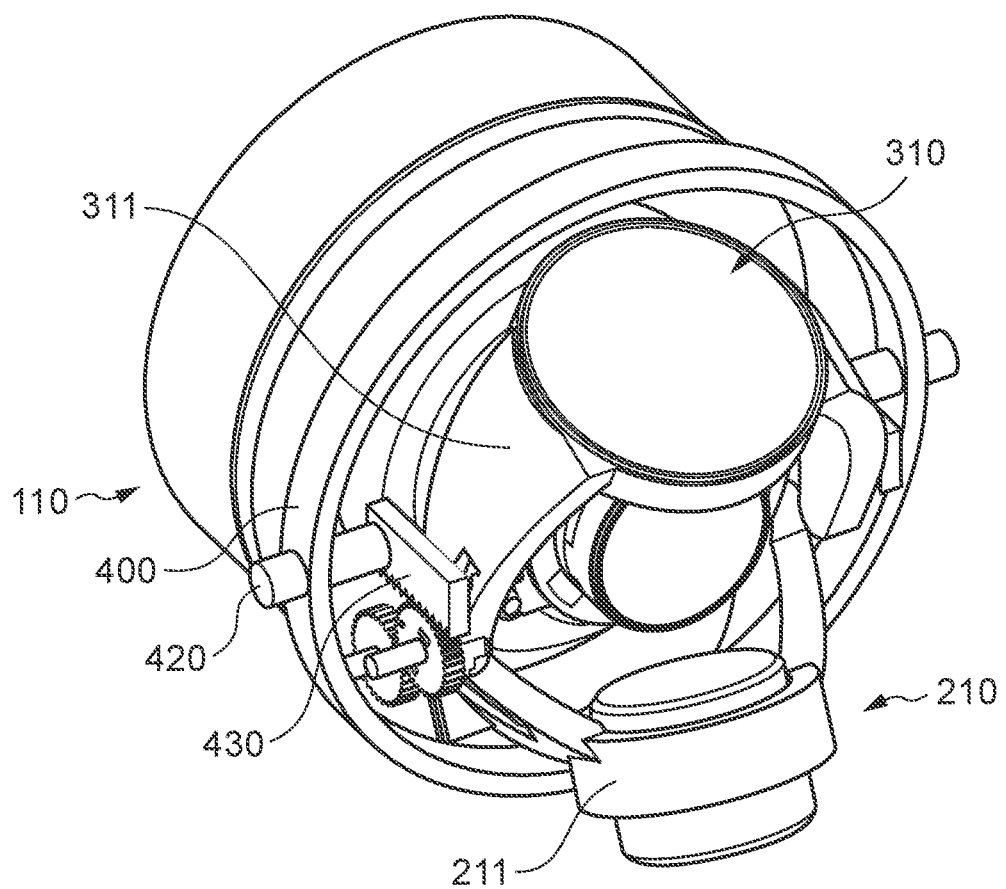
FIG. 11 is a perspective view illustrating each lens group of the interchangeable lens at the completion of transition according to the exemplary embodiment of the present disclosure.

FIG. 11 is a perspective view illustrating each lens group at the completion of transition from the second focal length range to the first focal length range similarly to FIG. 7. When the first lens group 110 further moves toward the image plane side along the first direction 115, the interlocking member 400 moves toward the object side in an opposite manner. In this manner, the first coupling portion 430 rotates the third coupling portion 450 that is coupled to the first coupling portion 430 by the above-mentioned engagement. The third lens group 310 is withdrawn from on the first optical axis 10 to the withdrawal position outside the optical path. The third coupling portion 450 rotates the second coupling portion 440 that is coupled to the third coupling portion 450 by the above-mentioned engagement. The second lens group 210 is withdrawn from on the first optical axis 10 to the withdrawal position outside the optical path.

Figure 12:
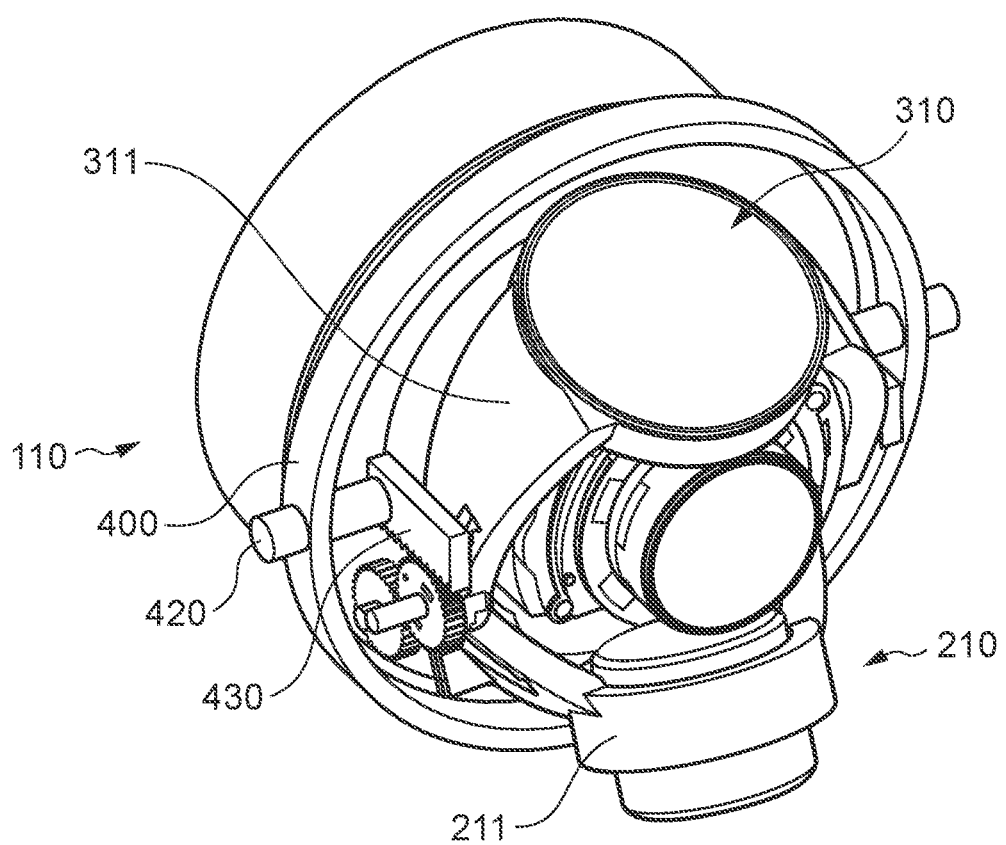
FIG. 12 is a perspective view illustrating each lens group of the interchangeable lens in the case of the first focal length range according to the exemplary embodiment of the present disclosure.

FIG. 12 is a perspective view illustrating the case where the imaging optical system is in the first focal length range similarly to FIG. 8. In the state illustrated in FIG. 12, the transition from the second focal length range to the first focal length range has been completed, and the second lens group 210 and the third lens group 310 are in a state of not moving from the respective withdrawal positions outside the optical path.

Figure 13:
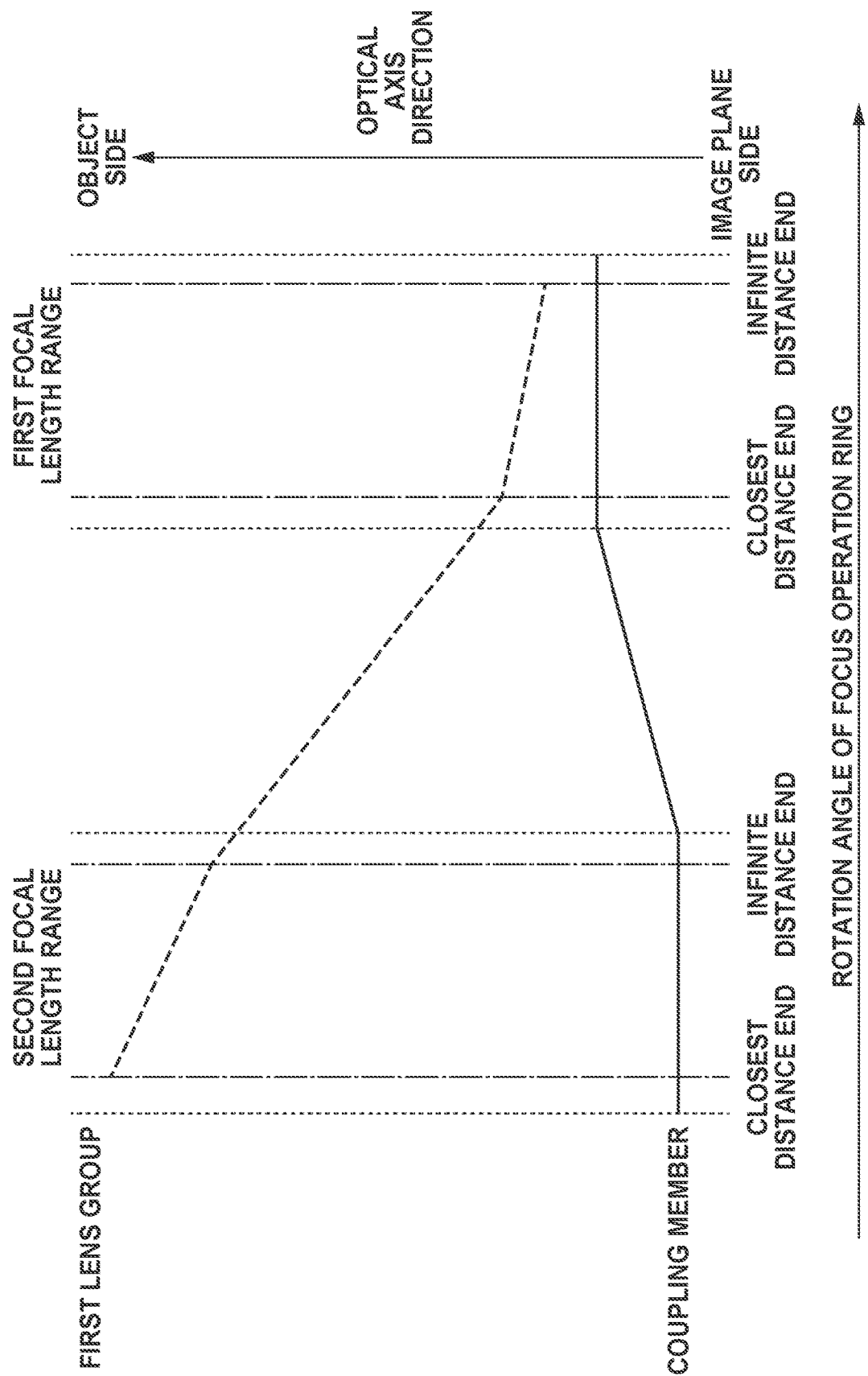
FIG. 13 is a graph indicating a relationship between a rotational angle of a cam barrel of the interchangeable lens and a position in an optical axis direction according to the exemplary embodiment of the present disclosure.

FIG. 13 is a graph illustrating amounts of movement of the first lens group 110 and the interlocking member 400 with respect to a rotational angle of the focus operation ring 103 when the imaging optical system transitions from the second focal length range to the first focal length range. In FIG. 13, an abscissa axis schematically indicates the rotational angle of the focus operation ring 103, and an ordinate axis schematically indicates distances of the first lens group 110 from the image plane 16 and distances of the interlocking member 400 from the image plane 16 in the first optical axis 10 direction. An upper side of the ordinate axis illustrated in FIG. 13 is the object side, and a lower side thereof is the image plane side.

The first lens group 110 linearly moves along the first optical axis 10 in accordance with the rotational angle of the focus operation ring 103, and is capable of performing desired focusing (focus adjustment).

The distance from the image plane 16 to the first lens group 110 is the largest at the closest distance end in the second focal length range, and the entire length of the interchangeable lens 100 becomes the largest when the distance between the image plane 16 and the first lens group 110 is the largest. With the transition from the second focal length range to the first focal length range, the distance of the first lens group 110 from the image plane 16 becomes smaller in a relatively abrupt manner, and the entire lens length of the interchangeable lens 100 becomes the smallest at the infinite distance end in the first focal length range.

It can be seen that the interlocking member 400 has not moved while keeping a distance from the image plane 16 between the closest distance end and the infinite distance end in the first focal length range and between the closest distance end and the infinite distance end in the second focal length range. Meanwhile, at the time of transition from the second focal length range to the first focal length range, the distance of the interlocking member 400 from the image plane 16 becomes larger. Hence, it can be seen that the first lens group 110 has moved toward the image plane side, and the interlocking member 400 has moved toward the object side on the opposite side of the image plane side, corresponding to the transition from the second focal length range to the first focal length range.

Focusing on each of the second focal length range and the first focal length range, a range from the closest distance end to the infinite distance end of each focal length range is a range in which the image-capturing can be performed, and the movement of each of the second lens group 210 and the third lens group 310 has to be in a state to be restricted. However, since there are various kinds of manufacturing errors or variations in assembly in the interchangeable lens 100 and the camera main body 1, there is a possibility that a timing of the start of the movement and a timing of the completion of the movement are off between the first lens group 110 and the interlocking member 400. To address this, as described above, at the time of transition from the second focal length range to the first focal length range, the interlocking member 400 belatedly starts to move toward the object side after the first lens group 110 starts to move toward the image plane side. The interlocking member 400 has already completed its movement before completion of the movement of the first lens group 110. In this manner, the present exemplary embodiment employs a configuration that is less susceptible to manufacturing errors and variations in assembly by differentiating a trajectory of the movement of the first lens group 110 and a trajectory of the movement of the interlocking member 400 from each other.

In the present exemplary embodiment, a combination of the second lens group 210 and the third lens group 310 constitutes the built-in conversion lens, but the present disclosure is not limited thereto. For example, a configuration in which switching between the first focal length range and the second focal length range may be implemented by using at least the second lens group 210. In this case, the third lens group 310 may be a neutral density filter, a protection filter, or a polarizing filter.

While the detailed description has been given of the present disclosure based on the preferred exemplary embodiment, the present disclosure is not limited to the specific exemplary embodiment. The present disclosure includes various exemplary embodiments without departing from the gist of the present disclosure.

Furthermore, each of the above-mentioned exemplary embodiments merely represents one exemplary embodiment of the present disclosure, and the exemplary embodiments can be combined as appropriate.

According to the present disclosure, the built-in conversion lens is withdrawn to change the focal length range, and efficiency of the configuration for withdrawing the built-in conversion lens is increased, whereby it becomes possible to provide an optical apparatus capable of preventing the lens from growing in size.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-021459, filed Feb. 15, 2022, which is hereby incorporated by reference herein in its entirety.

What is claimed is:

1. An optical apparatus comprising:
a first lens group;
a second lens group configured to change a focal length range of an optical system from a first focal length range to a second focal length range;
a guide barrel including a straight-guiding groove;
a cam barrel rotatably held by the guide barrel; and
an interlocking member including a first coupling portion,
wherein the first lens group includes a focus lens configured to move along a direction substantially parallel with an optical axis to adjust focusing,
wherein the cam barrel includes a first cam groove configured to move the first lens group and a second cam groove that is different from the first cam groove and is configured to move the interlocking member, and
wherein, when the focal length range of the optical system transitions from the second focal length range to the first focal length range, the first lens group is configured to be moved in a direction of the optical axis by the straight-guiding groove and the first cam groove, the interlocking member is configured to be moved in the direction of the optical axis by the straight-guiding groove and the second cam groove, and the first coupling portion is configured to withdraw the second lens group to outside of an optical path of the first lens group.

2. The optical apparatus according to claim 1, wherein, when the focal length range of the optical system transitions from the second focal length range to the first focal length range, the interlocking member is configured to start moving after the first lens group starts moving, and complete a movement before completion of a movement of the first lens group.

3. The optical apparatus according to claim 1, wherein, when the focal length range of the optical system transitions from the second focal length range to the first focal length range, the first lens group is configured to move toward an image plane side in parallel with the optical axis, and the interlocking member is configured to move toward an object side in parallel with the optical axis.

4. The optical apparatus according to claim 1,
wherein the second lens group includes a second coupling portion and a first rotary shaft that is substantially orthogonal to the optical axis,
wherein, when the focal length range of the optical system transitions from the second focal length range to the first focal length range, the first coupling portion is configured to be coupled to the second coupling portion, and withdraw the second lens group to the outside of the optical path of the first lens group centering around the first rotary shaft.

5. The optical apparatus according to claim 4, further comprising a third lens group configured to change the focal length range of the optical system from the first focal length range to the second focal length range.

6. The optical apparatus according to claim 5,
wherein the third lens group includes a third coupling portion and a second rotary shaft that is substantially orthogonal to the optical axis, and wherein, when the focal length range of the optical system transitions from the second focal length range to the first focal length range, the first coupling portion is configured to be coupled to the third coupling portion and withdraw the third lens group to the outside of the optical path of the first lens group centering around the second rotary shaft, and the third coupling portion is configured to be coupled to the second coupling portion and withdraw the second lens group to the outside of the optical path of the first lens group centering around the first rotary shaft.

7. The optical apparatus according to claim 6, wherein the first coupling portion is a rack, each of the second coupling portion and the third coupling portion is a gear, and the first coupling portion, each of the second coupling portion, and the third coupling portion are coupled to each other by engagement with each other.

8. The optical apparatus according to claim 6, wherein at least one of the second lens group or the third lens group is configured to be withdrawn, while being rotated, to a space generated by a movement of the interlocking member.

9. The optical apparatus according to claim 5,
wherein, in a case where the focal length range of the optical system is the second focal length range, the third lens group is located on an image plane side of the second lens group, and
wherein, in a case where the focal length range of the optical system is the first focal length range, the third lens group is located on an object side of the second lens group.

10. The optical apparatus according to claim 1, wherein the interlocking member includes a cam follower.

11. The optical apparatus according to claim 1, further comprising an operating member that is rotatable around the optical axis,
wherein the focus lens and the interlocking member are configured to move in conjunction with a rotation of the operating member.

12. An image-capturing apparatus comprising:
a camera main body including a camera mount; and
an optical apparatus including a lens mount that is connectable to the camera mount,
wherein the optical apparatus further includes:
a first lens group,
a second lens group configured to change a focal length range of an optical system from a first focal length range to a second focal length range,
a guide barrel including a straight-guiding groove,
a cam barrel rotatably held by the guide barrel, and
an interlocking member including a first coupling portion,
wherein the first lens group includes a focus lens configured to move along a direction substantially parallel with an optical axis to adjust focusing,
wherein the cam barrel includes a first cam groove configured to move the first lens group and a second cam groove that is different from the first cam groove and is configured to move the interlocking member, and
wherein, when the focal length range of the optical system transitions from the second focal length range to the first focal length range, the first lens group is configured to be moved in a direction of the optical axis by the straight-guiding groove and the first cam groove, the interlocking member is configured to be moved in the direction of the optical axis by the straight-guiding groove and the second cam groove, and the first coupling portion is configured to withdraw the second lens group to outside of an optical path of the first lens group.

* * * * *